C. W. ABBOTT.
ELECTRICAL CONDUIT.
APPLICATION FILED JUNE 22, 1914.

1,225,553.

Patented May 8, 1917.
2 SHEETS—SHEET 1.

WITNESSES

INVENTOR
Chauncey W. Abbott,
By Fredk H. Winter,
Attorney.

C. W. ABBOTT.
ELECTRICAL CONDUIT.
APPLICATION FILED JUNE 22, 1914.
1,225,553.
Patented May 8, 1917.
2 SHEETS—SHEET 2.
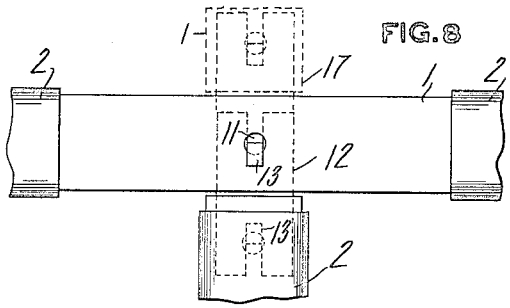
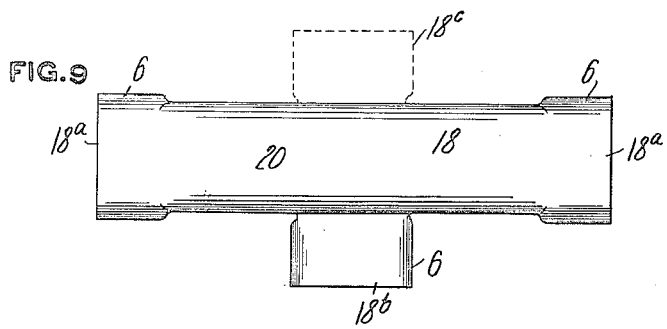
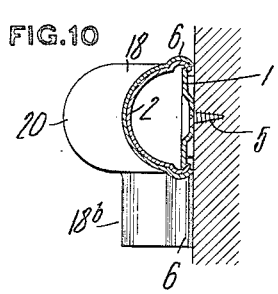
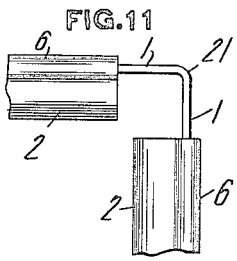
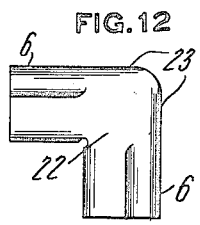
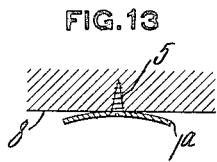
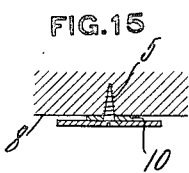
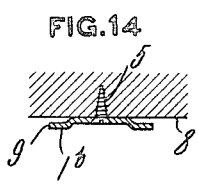
WITNESSES
INVENTOR
Chauncey W. Abbott,
By Fred'k W. Winter,
Attorney.

UNITED STATES PATENT OFFICE.

CHAUNCEY W. ABBOTT, OF AUBURN, NEW YORK, ASSIGNOR TO THE AMERICAN CONDUIT MANUFACTURING COMPANY, OF PITTSBURGH, PENNSYLVANIA, A CORPORATION OF PENNSYLVANIA.

ELECTRICAL CONDUIT.

1,225,553.   Specification of Letters Patent.   Patented May 8, 1917.

Application filed June 22, 1914. Serial No. 846,567.

*To all whom it may concern:*

Be it known that I, CHAUNCEY W. ABBOTT, a resident of Auburn, in the county of Cayuga and State of New York, have invented a new and useful Improvement in Electrical Conduits, of which the following is a specification.

This invention relates to that class of electrical conduits known as metal moldings. Said moldings are usually made from a base section adapted to be secured to a supporting surface, such as a wall or ceiling, and a removable cover section.

The object of the invention is to provide a conduit of the character specified of very simple construction, one easy and cheap to manufacture, easy to apply, which can be fitted to the wall or ceiling with no trimming or other shaping of the conduit, further than merely cutting the members to the desired length, by means of which new or additional branches can be readily installed without taking down more than the removable cover section, and one in which the members are so connected together as to effect the necessary electrical continuity.

The invention comprises a conduit constructed and arranged as hereinafter described and claimed.

Figure 1:
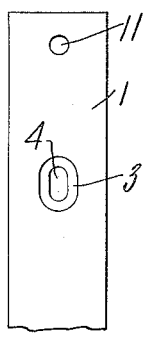
Figure 2:
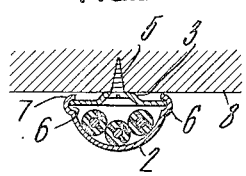
Figure 7:
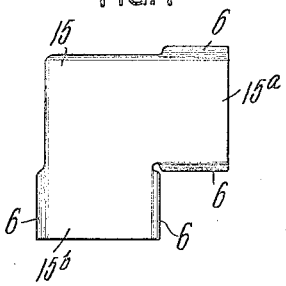
Figure 6:
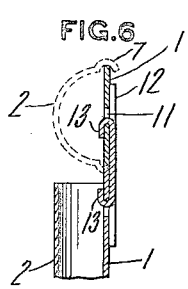
Figure 5:
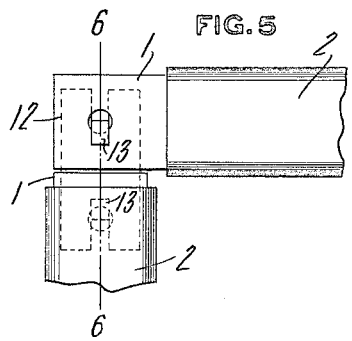
Figure 4:
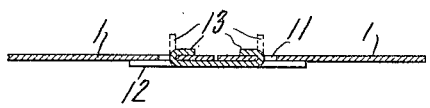
Figure 3:
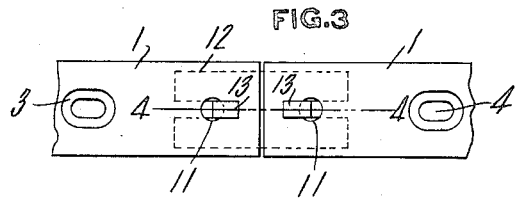

In the accompanying drawings Figure 1 is a plan view of the preferred form of base member; Fig. 2 is a transverse section showing the base and cap members assembled and showing electrical conductors therein; Fig. 3 is a plan view of the ends of two base members with a coupling member uniting the same; Fig. 4 is a section therethrough on the line 4—4, Fig. 3; Fig. 5 shows the manner of making a connection or coupling at an angle; Fig. 6 is a section on the line 6—6, Fig. 5; Fig. 7 is a view of the cover at an angle; Fig. 8 illustrates the manner of making a connection for a T or cross; Figs. 9 and 10 show the cover for a T or cross; Fig. 11 shows the manner of turning an internal corner; Fig. 12 shows the cover for such corner; and Figs. 13, 14 and 15 show modified forms of base members.

The improved conduit comprises a base member or strip 1 and a cover 2. The base member 1 is preferably a flat strip such as shown in Figs. 1 and 2 provided at intervals on its rear face with protuberances or bosses 3 for spacing the edges thereof slightly from the supporting surface. Preferably these bosses will be counter-sinks around openings 4 for the securing screws or nails 5, so that in addition to serving as spacing members, said bosses form counter-sinks for the heads of the fastening means and leave the interior of the conduit smooth and unobstructed. Preferably the counter-sinks and holes 4 are elongated to allow for adjustment and give greater latitude in placing the fastening screw or nail. This base member will be a strip of any suitable base metal of uniform width and has its edge portions parallel or substantially parallel to and spaced from the supporting surface and projecting laterally in opposite directions and having fairly well defined corners.

The cover member 2 is made from a strip of thin resilient material, such as sheet steel, preferably by a drawing process. In cross section it is of general U, channel or bow shape, and each edge on the inner face of the cover is formed with a groove 6, which grooves are of material depth and formed with fairly steep sides, or on a short radius, so that when engaged with the edges of the base a firm grip is secured. The contour of this section is such that its body forms practically a bow spring, and as the material is resilient the deep grooves 6 securely engage the square edges of the base with the edges of the cover lying behind the back surfaces of the edge portions of the base and hold the cover from accidentally pulling from the base. The extreme edges 7 of the cover strip are curved inwardly, so that the cover can be put in place by hooking one edge over one edge of the base strip and bringing the other edge down against the base strip and then pressing on the body of the cover, which tends to flatten it and causes the free edge to snap over the opposite edge of the base strip, where it will be firmly held as described. This firm grip is of particular importance because conduits of this character are extensively used for wiring old buildings in which the walls and ceilings are more or less wavy so that unless there is a firm grip between the cover and base member the cover is liable to spring loose at those points where the wall or ceiling is depressed, it being understood, of course, that the base strip follows the waves of the supporting surface.

The bosses 3 space the edges of the base member from the supporting surface 8, so as to allow for the ready entrance of the edges of the cover behind the base strip. The base member may also be dished longitudinally as shown at 1ª in Fig. 13, or provided with a longitudinal channel, as shown at 1ᵇ in Fig. 14, in which the body portion is depressed, and having the edge portions 9 elevated with reference to the body portion, to stiffen the base, but still projecting laterally in opposite directions and in a plane parallel or substantially parallel to the supporting surface so as to be engaged by the edges of the cover strip in the same manner as the main form described. Another form is shown in Fig. 15 in which the strip is perfectly flat and is spaced from the supporting surface by separate spacing washers or the like 10 which are held in place by the securing screws or nails 5.

This very simple form of base strip lends itself admirably to fitting in place and for making all kinds of turns and angles. To join the ends of two base strips the simple connection shown in Figs. 3 and 4 is used. The two base strips are merely butted end to end, and each is provided with a punched opening 11. The connection is made by means of a coupling strip or plate 12 which is of thin flat metal, and which lies between the base strips and the supporting surface in the space provided by the spacing bosses 3. This coupling strip has a pair of tongues 13 cut out therefrom and turned outwardly and inserted through the holes 11, and clenched down on the upper surface of the base members, as clearly shown in Figs. 3 and 4. This connection can be made by any ordinary tool and requires no trimming or fitting whatsoever because the ends of the base strips need merely be butted against each other. The connection is firm and provides the necessary electrical continuity. The coupling strip is slightly narrower than the base strip, as shown in Fig. 3, so that the edges of the base strip are still perfectly free to have the cover snapped over the same. A joint in the base strips requires no change whatsoever in the cover member.

For making a joint with the base strips at an angle to each other but in the same plane, as shown in Figs. 5 and 6, the same coupling member as shown in Fig. 3 is employed, but in this case the two base strips are placed at an angle of 90° to each other with the end of one butting against the edge of the other. A special angle or elbow cover member 15 is provided for covering the connected angle, this being a pressed angle member with the two legs 15ª and 15ᵇ of U, channel or bow shape at right angles to each other and each provided at its ends with the inturned edges or grooves 6 which snap over the edges of the corresponding base strips.

The manner of connecting a T or a cross is substantially similar to the angle connection, and is indicated in Fig. 8, that is, the end of one base strip is butted against the edge of the other base strip, and the two are connected by a coupling plate 12 such as shown in Figs. 3 and 4. In case of a cross another base strip is butted against the opposite edge of the horizontal base strip, as shown in dotted lines at 17, and the coupling plate in this case will be provided with three tongues and must be sufficiently long to provide a tongue for engaging with an opening in each of the base strips. For a T joint the special cover member 18, shown in Figs. 9 and 10, is employed, with legs 18ª and 18ᵇ at right angles to each other, and for a crossing an exactly similar member except that it will have an additional leg 18ᵇ on the side opposite to the one shown in full lines, as shown in dotted lines at 18ᶜ. The edges of the several legs of this cover at the ends are turned in and provided with grooves 6 for engaging the edges of the base strips. Inasmuch as at T's and crossings the electrical conductors are usually spliced, the cover or cap member 18 will have an upward extension, forming a hood 20, to provide space for the spliced conductors.

When turning either internal or external angles such as in working around columns on a wall or beams on a ceiling, the base strip is merely bent at an angle, as shown at 21, Fig. 11, which shows the bend for an internal angle. For an external angle, the bend is in the opposite direction. Inasmuch as the base is a plain flat strip such bend can be readily made in place by the workman without any special tools and at exactly the point where the bend is necessary, thereby insuring a good fit of the conduit around columns, beams and other similar places. A special angle cover member, such as shown at 22, Fig. 12, will be employed at such bends. This cover is open on the side indicated by the numeral 23, and has its edges at the end turned in, as at 6, to engage the edges of the base.

Various other connections such as are frequently encountered in wiring up old buildings can be made with equal facility. The only special parts required are special covers for special angles or turns. For straightaway work no special covers are necessary and no fitting other than merely cutting the standard base members and covers to the desired length. In case it is desired to take a branch from an installed conduit it is merely necessary to take off the removable cover at the point where the branch is to come off, and the branch is made by merely butting an end of the base member for the branch against the side edge of the old base member, fasten it in place, make the necessary electrical connections, place cover strips over the old and branch members, and fit a T cover at the point where the branch is taken off. This is in marked contrast with prior forms of conduits having a special or troughed shape base member and which has required the removal of the base member as well as the cover at the place where the branch is to be taken off.

What I claim is:—

1. A joint for electrical conduits, comprising a pair of substantially flat base sections disposed at an angle one to the other and lying with the end of one base section in immediate proximity to the other base section, said base sections being provided with edge portions closely spaced from and substantially parallel to the supporting surfaces by which they are carried, and a cover member of resilient material having portions of general U- or channel-shaped cross section lying at an angle to each other, each portion thereof having its edges turned inwardly to lie around the edges of the base sections.

2. A joint for electrical conduits, comprising a pair of substantially flat base members having edge portions closely spaced from and substantially parallel to a supporting surface, one of said members having an end thereof lying in proximity to a lateral edge of the other member, and a cover member of resilient material having portions of general U-shaped cross section lying at an angle to each other, each portion thereof having its edges turned inwardly to engage over the edges of the base members.

3. A joint for electrical conduits, comprising a pair of substantially flat base members having edge portions closely spaced from and substantially parallel to a supporting surface, one of said members abutting endwise against an edge of the other member, and a cover member of resilient material having portions of channel or bow shape in cross section lying at an angle to each other, each portion thereof having its edges turned inwardly to engage over the edges of the base members.

4. A joint for electrical conduits, comprising a pair of substantially flat base members closely spaced from and substantially parallel to a supporting surface, one of said members abutting endwise against an edge of the other, a coupling plate uniting said base members, and a cover member of resilient material and comprising a body of general U, channel or bow shape in cross section and having edge portions turned inwardly to engage over the edges of said base members.

5. A joint for electrical conduits, comprising a pair of substantially flat base members lying in the same plane and having edge portions closely spaced from and substantially parallel to a supporting surface, one of said members abutting endwise against a side edge of the other, cover members engaging with said base members, and a joint cover member having portions at an angle to each other and whose edges engage with the edges of said cover members.

In testimony whereof, I have hereunto set my hand.

CHAUNCEY W. ABBOTT.

Witnesses:
WILLIAM B. WHARTON,
GLENN H. LERESCHE.